(12) United States Patent
Torpy et al.

(10) Patent No.: US 11,256,512 B2
(45) Date of Patent: Feb. 22, 2022

(54) MULTIPROCESSOR UTILITY METER FEATURING A METROLOGY PROCESSOR COUPLED TO AN APPLICATION PROCESSOR

(71) Applicant: Landis+Gyr Innovations, Inc., Alpharetta, GA (US)

(72) Inventors: Keith Torpy, Sydney (AU); Matt Karlgaard, Brainerd, MN (US); David Decker, Atlanta, GA (US); James Randall Turner, Alphretta, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 3 days.

(21) Appl. No.: 16/829,456

(22) Filed: Mar. 25, 2020

(65) Prior Publication Data

US 2020/0379765 A1    Dec. 3, 2020

Related U.S. Application Data

(60) Provisional application No. 62/855,080, filed on May 31, 2019.

(51) Int. Cl.
*G06F 9/38* (2018.01)
*G01D 4/00* (2006.01)
(Continued)

(52) U.S. Cl.
CPC .......... *G06F 9/3836* (2013.01); *G01D 4/002* (2013.01); *G01R 22/063* (2013.01); *G06F 8/65* (2013.01);
(Continued)

(58) Field of Classification Search
None
See application file for complete search history.

(56) References Cited

U.S. PATENT DOCUMENTS 5,874,903 A    2/1999 Shuey et al.
6,038,516 A    3/2000 Alexander et al.
(Continued)

FOREIGN PATENT DOCUMENTS

EP    2863183    4/2015

OTHER PUBLICATIONS

U.S. Appl. No. 16/829,550, Notice of Allowance, dated Oct. 5, 2020, 10 pages.

(Continued)

*Primary Examiner* — Michael Sun
(74) *Attorney, Agent, or Firm* — Kilpatrick Townsend & Stockton LLP

(57) ABSTRACT

A utility meter has a multiprocessor architecture including (i) a microprocessing unit (MPU) for executing multiple software applications and (ii) another processing unit for performing core metrology functions in real time. For instance, the utility meter includes a metrology engine, an MPU, and one or more metrology applications. The metrology engine measures consumption of a resource and generates consumption data based on the consumption of the resource. The metrology engine includes a metrology processor, a dedicated memory, and a real-time operating system run by the metrology processor to enable the metrology engine to run time-critical metrology functions in real time. The MPU is coupled to the metrology processor and includes one or more processor cores. The MPU runs the one or more metrology applications over a primary operating system of the MPU, and the one or more metrology applications utilize the consumption data.

20 Claims, 5 Drawing Sheets

(51) Int. Cl.

| | | |
|---|---|---|
| *G06F 9/50* | (2006.01) | |
| *G01R 22/06* | (2006.01) | |
| *G06F 8/65* | (2018.01) | |
| *G06Q 20/10* | (2012.01) | |
| *G06Q 50/06* | (2012.01) | |
| *H04Q 9/00* | (2006.01) | |
| *H04W 12/06* | (2021.01) | |
| *H04W 12/08* | (2021.01) | |

(52) U.S. Cl.
CPC ........... *G06F 9/5077* (2013.01); *G06Q 20/10* (2013.01); *G06Q 50/06* (2013.01); *H04Q 9/00* (2013.01); *H04W 12/06* (2013.01); *H04W 12/08* (2013.01); *H04Q 2209/40* (2013.01); *H04Q 2209/50* (2013.01); *H04Q 2209/60* (2013.01)

(56) References Cited

U.S. PATENT DOCUMENTS

| | | | |
|---|---|---|---|
| 7,209,049 B2* | 4/2007 | Dusenberry | H04Q 9/00 340/870.02 |
| 7,412,882 B2 | 8/2008 | Lazar et al. | |
| 8,635,036 B2 | 1/2014 | Pamulaparthy et al. | |
| 9,473,921 B2* | 10/2016 | Kempf | H04W 4/60 |
| 9,594,659 B2* | 3/2017 | Tene | G06F 11/3423 |
| 10,922,763 B2 | 2/2021 | Torpy et al. | |
| 2002/0040355 A1 | 4/2002 | Weiner | |
| 2010/0289652 A1 | 11/2010 | Javey et al. | |
| 2011/0061014 A1* | 3/2011 | Frader-Thompson | G06Q 30/0277 715/771 |
| 2012/0173032 A1* | 7/2012 | Pamulaparthy | G06Q 10/06 700/295 |
| 2013/0176141 A1 | 7/2013 | Lafrance et al. | |
| 2014/0005964 A1 | 1/2014 | Rouaud et al. | |
| 2014/0167978 A1 | 6/2014 | Popa et al. | |
| 2016/0290838 A1 | 10/2016 | Mudireddy et al. | |
| 2017/0150239 A1 | 5/2017 | Davis et al. | |
| 2017/0180355 A1 | 6/2017 | Enns et al. | |
| 2018/0007452 A1 | 1/2018 | Barrett et al. | |
| 2018/0225230 A1* | 8/2018 | Litichever | G06F 21/82 |

OTHER PUBLICATIONS

U.S. Appl. No. 16/829,550, Non-Final Office Action dated Jul. 15, 2020, 21 pages.

International Patent Application No. PCT/US2020/035336, International Search Report and Written Opinion dated Aug. 28, 2020, 14 pages.

International Patent Application No. PCT/US2020/035332, International Search Report and Written Opinion, dated Sep. 11, 2020, 10 pages.

\* cited by examiner

MULTIPROCESSOR UTILITY METER FEATURING A METROLOGY PROCESSOR COUPLED TO AN APPLICATION PROCESSOR

CROSS-REFERENCE TO RELATED APPLICATIONS

The present disclosure claims priority to U.S. Provisional Application Ser. No. 62/855,080 for "Multiprocessor Utility Meter Featuring a Metrology Processor Coupled to an Application Processor," filed May 31, 2019, which is incorporated by reference herein in its entirety.

TECHNICAL FIELD

Implementations described herein relate to utility meters and, more particularly, to a multiprocessor utility meter featuring a metrology processor coupled to an application processor.

BACKGROUND

Generally, utility meters measure the consumption of a resource, such as electricity, water, or gas. Typically, a utility meter is installed at or near a premises to measure consumption on that premises. A utility meter is typically provided by a service provider, which manages the utility meter as needed to ensure that the utility meter is fully operational and that accurate consumption measurements are taken. In some cases, a utility meter has an integrated radio and thereby participates in a wireless mesh network. Through the wireless mesh network, the utility meter reports consumption to a remote, centralized headend system that is in communication with and is responsible for services across a plurality of utility meters. A high level of accuracy is required in the measuring and reporting of consumption because consumers are billed based on their consumption, as measured at the utility meter.

Existing utility meters typically utilize a microcontroller, which incorporates a central processing unit integrated with random-access memory (RAM) and read-only memory (ROM) on a single chip. Firmware installed over the hardware implements operations such as consumption sampling and reporting. Due in part to the limited storage space available on the utility meter, the firmware is monolithic such that most or all aspects of meter functionality are coded into the firmware and dependent on one another.

A utility meter additionally includes a display, which is useful to provide data to a technician or to report data locally. Maintenance typically occurs locally, where a technician reads the display integrated with the utility meter or attaches a physical tool to the utility meter for servicing.

SUMMARY

In one implementation, a utility meter includes a metrology engine, a microprocessing unit (MPU), and one or more metrology applications. The metrology engine measures consumption of a resource and generates consumption data based on the consumption of the resource. The metrology engine includes a metrology processor, a dedicated memory, and a real-time operating system (RTOS) run by the metrology processor to enable the metrology engine to run time-critical metrology functions in real time. The MPU is coupled to the metrology processor and includes one or more processor cores. The MPU runs the one or more metrology applications over a primary operating system of the MPU, and the one or more metrology applications utilize the consumption data.

In another implementation, a utility meter includes a metrology engine, an MPU, a primary memory, a primary operating system, and one or more metrology applications. The metrology engine measures consumption of a resource and generates consumption data based on the consumption of the resource. The metrology engine includes a microcontroller unit (MCU), including a metrology processor and a dedicated memory, and an RTOS run by the MCU to enable the metrology engine to run time-critical metrology functions in real time. The MPU is coupled to the metrology processor and includes one or more processor cores. The primary memory is associated with the MPU and distinct from the dedicated memory of the metrology engine. The MPU runs the primary operating system, which is distinct from the RTOS of the metrology unit. Additionally, the MPU runs the one or more metrology applications over the primary operating system of the MPU, and the one or more metrology applications utilize the consumption data.

In yet another implementation, a method includes installing into a utility meter an MPU having one or more processor cores. The method further includes installing into the utility meter a metrology engine coupled to the MPU and configured to measure consumption of a resource and to generate consumption data based on the consumption of the resource. The metrology engine includes a metrology processor and a dedicated memory. The method further includes installing an RTOS over the metrology processor to enable the metrology engine to run time-critical metrology functions in real time. Additionally, the method includes installing one or more metrology applications over a primary operating system of the MPU, where the one or more metrology applications utilize the consumption data.

This illustrative implementation is mentioned not to limit or define the disclosure, but to provide an example to aid understanding of the invention. Additional implementations are discussed in the Detailed Description, and further description is provided there.

BRIEF DESCRIPTION OF THE FIGURES

These and other features, aspects, and advantages of the present disclosure are better understood when the following Detailed Description is read with reference to the accompanying drawings.

DETAILED DESCRIPTION

Figure 1:
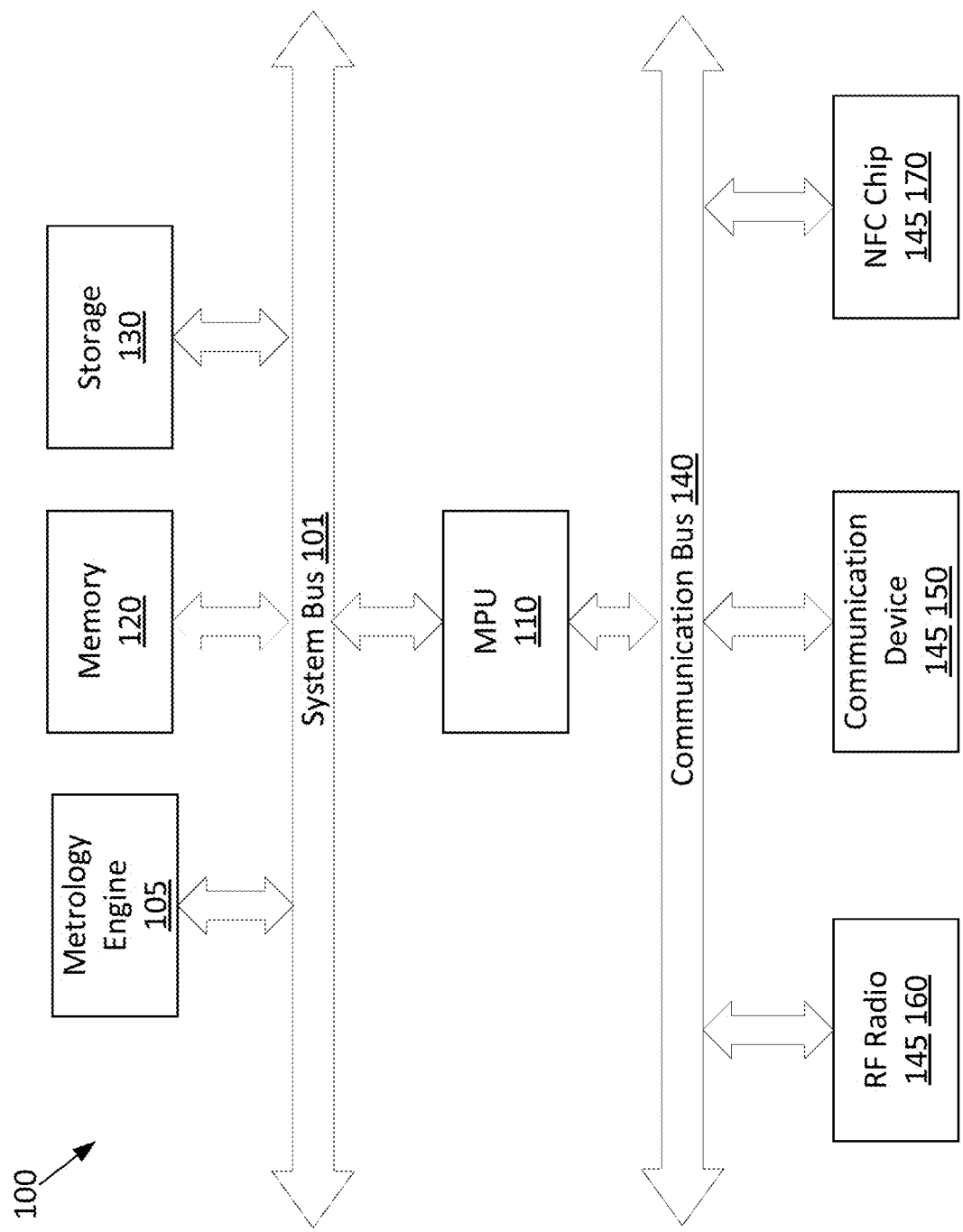
FIG. 1 is a diagram of an example hardware architecture of a utility meter, according to some implementations described herein.

Several drawbacks exist in the current hardware and firmware of utility meters. A single microcontroller unit (MCU), as is used in most utility meters, is incapable of true multithreading to efficiently run complex applications. Further, the firmware is a single piece of code for all operations of the meter. While the code may include portions that perform different tasks, those portions are dependent on one another within the firmware. As a result, firmware upgrade times are long because each firmware upgrade impacts all operations represented in the firmware code. If the code is ever corrupted, the corruption impacts the entire utility meter, rather than just a single function.

According to some implementations described herein, however, a utility meter has a multiprocessor architecture, utilizing a microprocessing unit (MPU) coupled to (i.e., in communication with) an additional metrology processor. The MPU may have multiple cores. The metrology processor, which may be an MCU, is configured to run time-critical metrology functions in real time while the MPU runs various applications through the use of multithreading or multiprocessing. In some implementations, the metrology processor runs a real-time operating system to ensure real-time processing of the metrology functions. Applications for functionality other than core metrology functionality may run over the MPU, which need not have a real-time operating system and need not have enforced real-time operability. Some implementations of the utility meter include an additional MCU or other processor to support other real-time operations, such as network communications.

Additionally or alternatively to the above, according to some implementations described herein, a utility meter lacks an integrated display such as a liquid crystal display (LCD) screen. Rather than include its own display, the utility meter is connectable to a smartphone or other device. The utility meter is configured to transmit data describing consumption data, operations of the utility meter, or other data to the smartphone or other device, such that a user can view such data on the smartphone or other device.

Implementations of the utility meter, also referred to as a meter, described herein provide various technical advantages over conventional utility meters. Through the inclusion of multiple cores in the MPU, the rate of instruction processing can be increased, for instance, by four to twelve times. By utilizing separate memory, rather than only memory built into an MCU, memory space can be increased, for instance, by two or more times. In some implementations, individual applications can be installed. This modularity supports the creation of independent applications, which can be used selectively across utility meters, such that each utility meter can be configured in a customized manner. More specifically, in some implementations, a utility meter can be tailored with applications suited for the specific use of that utility meter. In some implementations, the architecture of the utility meter enables applications to be deployed after commissioning of the utility meter on an as-needed basis. Further, the modularity of applications on the utility meter enables users to write, modify, or install their own applications for custom management of the utility meter. For instance, a user can install applications for manipulating, processing, or managing the meter or metrology data, which is data generated by or collected by the meter.

As a result, in some implementations, real-time functionality remains supported in a utility meter according to some implementations, and the utility meter is further capable of broader, more complex functionality running efficiently over high-performance MPU that acts as an application engine, where each application can be separately upgraded, installed, or uninstalled as needed. Implementations of the utility meter described herein provide a more robust platform for standard protocols and interfaces as well as new or custom functionality. The hardware and software described herein together deliver a feature set that is scalable, secure, and easily maintained.

Implementations of the meter described herein are capable of powerful decision-making, enabling the redistribution of tasks within a network of meters and other nodes. For instance, conventionally, meters report consumption to other nodes in a network, and this consumption is eventually delivered to a headend system responsible for centralized decision-making. However, according to some implementations, a meter includes appropriate intelligence, in the form of hardware or software applications as described herein, to enable decision-making to be performed at the meter itself. For example, and not by way of limitation, a meter described herein may monitor power quality and take corrective action. Thus, implementations of the meter provide edge intelligence, which can reduce network communications overhead, reduce bottlenecks between endpoints and the headend system, or reduce the workload on the headend system or other nodes. Distributed intelligence may be made possible through utilizing a group of meters described herein, connected through a network, such that a centralized source (e.g., a headend system) is no longer responsible for all or the bulk of analysis and decision-making.

FIG. 1 is a diagram of an example hardware architecture of a utility meter 100, according to some implementations of the invention. The utility meter 100, also referred to herein as a meter 100, can be used to measure consumption of one or more resources, such as electricity, water, or gas. In some implementations, the meter incorporates metrology functionality (e.g., measuring consumption) while supporting software applications that utilize the data generated by the metrology functionality, potentially in addition to other applications. As shown in FIG. 1, in some implementations, the meter 100 includes one or more of the following, which may be connected together by way of a system bus 101: a metrology engine 105 for performing core metrology functions 105, an MPU 110 having one or multiple cores, memory 120, and storage 130. Each peripheral device 145 is built into the meter 100 or connected by way of an auxiliary slot, for instance. In some implementations, a communication bus 140 integrates one or more peripheral devices 145, including one or more communication devices 150, into the meter 100 as well. However, it will be understood that the communication bus 140 is not required and that, alternatively, each peripheral device 145 is connected to the MPU 110 by way of a respective interface, such as a software driver.

Generally, in contrast to a conventional meter, implementations of the meter 100 described herein are MPU-based, with the MPU 110 at the heart of the meter 100. In some implementations, time-critical functionality of the meter 100 is performed by the embedded, or connected, metrology engine 105 or on one or more peripheral devices 145. This time-critical functionality includes, for example, the determination and radio-based reporting of consumption data, which is data describing the amount of a resource (i.e., the utility) that has been consumed in each of various time intervals associated with that consumption. More specifically, for instance, metrology accumulation and calculation are determined by the metrology engine 105, which is able to perform operations in real time. For example, and not by way of limitation, the metrology engine 105 utilizes a real-time operating system (RTOS), and radio functionality runs over the same RTOS or a different RTOS on a peripheral device 145. In some implementations, higher-level applications that are less time critical run over the MPU 110, which need not enforce real-time functionality. These aspects and others are discussed in more detail below.

The MPU 110 has one or multiple cores. In some implementations, the operating system on the MPU 110 supports multithreading, multiprocessing, or both. Additionally or alternatively, if the MPU 110 has multiple cores, each core may be responsible for a subset of the functionality in the meter. Additionally or alternatively, the multiple cores may work on the same functionality while enabling tasks to be performed in parallel (e.g., multithreading). Example uses of the multiple cores are provided in more detail below, specifically with respect to FIG. 3 and FIG. 4.

According to some implementations, a wide range of functionality may be implemented as applications supported by the MPU 110. For example, and not by way of limitation, one or more of the following functionalities may be implemented as applications supported by the MPU 110 and, thus, run on the MPU 110: time-of-use enablement, loading specific profiles for how a resource is consumed, cryptocurrency transactions for payments or otherwise, automated outage reporting, crowdsourcing information related to utility usage, detecting usage patterns, enabling or detecting electric vehicle charging, enabling connection of solar or other renewable energy source, detecting solar power production, enabling or detecting battery management, inverter management, load control, and connection to home automation or control systems.

In some implementations, the use of a multithreading or multiprocessing MPU 110 as described herein enables a wide range of complex applications not supported by existing meters. For instance, an artificial intelligence (AI) application may run on the meter 100. As a result, AI may be used to process consumption data related to the premises for which the meter 100 is responsible, process data received from other nodes (e.g., other meters) on a common utility grid, or process other data related to the utility grid of the meter 999. For example, an AI application runs on the meter 100 and, as such, processes consumption data describing consumption on the premises to determine which appliances are in use on the premises based on appliance power signatures (i.e., load disaggregation). For another example, an AI application runs on the meter 100 and, as such, processes data received from another meter to determine that the other meter has lost power. For yet another example, if the meter 100 has access to control a capacitor bank, an AI application runs on the meter 100 and, as such, processes data related to one or more other meters on a common utility grid to make decisions about whether or when to turn on the capacitor bank to control power factor based on one or more measurements of the power factor on one or more electric meters. Additionally or alternatively, if the meter 100 cannot control a capacitor bank directly, the meter 100 may initiate turning on of the capacitor bank by issuing a notification to a remote resource that can cause the capacitor bank to turn on. One or more of these or other AI features may be embodied in an application executed by the meter 100.

More specifically, in some implementations, a machine-learning (ML) model may be implemented on the meter 100, such that the machine-learning model is trained to recognize occurrences, such as the running of a certain appliance, an inadequate power factor, or lost power in a nearby meter 100. The ML model may be, for example, a neural network, a decision tree, classification model, or some other ML model. For instance, prior to being loaded onto the utility meter, such an ML model is trained based on training data including a set of tuples, each tuple including (a) a feature vector (e.g., a set of features) describing a current state of the utility meter and (b) a label indicating an occurrence of interest. The features can include, for instance, a usage pattern of consumption of electricity or some other resource being measured. Specifically, for instance, a feature vector can include a set of values corresponding to amounts (e.g., in kilowatt-hours) of the resource used over various intervals. The label can indicate, for example, which appliances are in use, whether a power factor is inadequate, or whether the meter or a neighboring meter has lost power. Given the training data, the ML model learns to map feature vectors to labels. As such, during operation of the utility meter, the ML model on the utility meter can receive as input features describing a state of the meter at a given time and can therefore predict a label, such as an indication of which appliances are in use, an indication of whether the power factor is inadequate, or an indication that the meter or a neighboring meter experienced a power outage.

In some implementations, the meter 100 performs one or more of the tasks described above as being performed by an ML model, but does so through a technique additional or alternative to use of an ML model. For instance, an implementation of the meter 100 maintains a decision tree, which need not be based on machine learning. The meter 100 may input into the decision tree a current state of the meter 100 (e.g., a feature vector describing the state), and through use of the decision tree, the meter 100 may decide which actions to take. Such actions can include one or more of those described above, such as sending a notification or initiating the turning on of a capacitor bank. It will be understood that various techniques are useable to provide edge intelligence at the meter 100.

Additionally or alternatively, some implementations of the meter 100 are capable of running one or more virtual machines or container applications, which are not conventionally supported in utility meters. Further, additionally or alternatively to running local applications, the meter 100 may utilize a communication device 150 to access and use a cloud-based application. For instance, a customer using a meter 100 may be associated with a private cloud within that customer's control. In that case, the meter 100 could access the cloud, such as through a gateway, to run whatever applications are installed in the cloud. Cloud-based applications accessible to the meter 100 can include applications performing, for instance, power quality monitoring, grid topology or mapping, phase identification, AI-based functions, or energy disaggregation. The meter 100 can connect to the cloud by way of a wireless mesh network, a cellular connection, or some other communication technique.

Applications may be installed on the meter 100 by way of various mechanisms. For example, and not by way of limitation, an application may be installed from a remote system, such as a headend system or a cloud server; locally by way of wired connection to the meter; or locally by way of a direct wireless connection such as near-field communication (NFC), Bluetooth, or wireless fidelity (WiFi). Through access to one or more virtual machines or clouds, the meter 100 can, for example, run applications not supported by a native operating system of the meter 100.

As shown in FIG. 1, in certain implementations, the meter 100 includes a memory 120 separate from the MPU 110. In some implementations, the memory 120 is RAM. For example, and not by way of limitation, the meter hardware utilizes 1-2 gigabytes of RAM. Storage may be flash storage, for example, which may be at least 8 gigabytes in some implementations. It will be understood, however, that various other memory 120 or storage 130 may be used and that the size of such memory 120 and storage 130 varies across implementations.

The communication devices 150 of the meter 100 may include, for example, a radio frequency (RF) radio 160 enabling radio communications, a WiFi device (not shown) enabling WiFi communications, a cellular device (not shown) enabling cellular communications, and an NFC chip 170 enabling NFC communications. In some implementations, the meter 100 utilizes the RF radio 160 for two-way communications with a headend system, such as for reporting consumption data to the headend system or for the communication of other data relevant to a network of meters and other devices. In some implementations, the RF radio 160 utilizes a physical layer (PHY) and a media access control (MAC) layer, where the PHY connects the MAC to a physical medium capable of data transmission. In some implementations, the MAC and the PHY perform time-critical functions that must be performed in real time. Thus, the MAC and PHY layers may be performed by an RTOS or other operating system separate from the primary operating system of the MPU 110, and thus, the RF radio 160 may be embedded into a peripheral device 145 integrated with, or otherwise connected to, the MPU 110. If used, the WiFi device may enable networking with nearby devices, such as other meters 100 or smart devices proximate the meter 100. For example, and not by way of limitation, the meter 100 is an Internet of Things (IoT) device, and the WiFi device enables the meter 100 to communicate with other IoT devices.

In some implementations, the meter 100 utilizes a communication device 150 to collect consumption data from external sources. For example, and not by way of limitation, a peer meter or a sub-meter may directly measure consumption that is not directly measured by the meter 100 itself, and from such peer meter or sub-meter, the meter 100 may receive consumption data describing such measurements. For instance, a sub-meter may measure the electricity consumed to charge an electric vehicle and may transmit to the meter 100 consumption data describing that consumption. The meter 100 may receive such consumption data, for example, via WiFi or Bluetooth or over a wireless mesh network. As such, the meter 100 may collect consumption data from various sources and may aggregate that consumption data for billing or other purposes.

As shown in FIG. 1, an implementation of the meter 100 incorporates an NFC chip 170. For example, and not by way of limitation, the NFC chip 170 may have a range of up to four centimeters, approximately four centimeters, up to three feet, three to five feet, or various other ranges. The NFC chip 170 may have various uses in the meter 100. For instance, the NFC chip 170 can be used during manufacturing or configuration of the meter to enable tracking of the meter 100 itself during manufacturing or configuration. As will be described in detail below, the NFC chip 170 or other communication device can be used to communicate with a local smartphone or other external device. For instance, a smartphone can connect directly to the meter 100 via the NFC chip 170 of the meter 100 to enable the smartphone to display a user interface of the meter 100. Thus, the smartphone can display consumption data or other information related to the meter 100 on demand. As described in more detail below, some implementations of the meter 100 lack a display, a component that is conventionally integrated into utility meters. A meter 100 without a display is potentially less costly to manufacture than is a utility meter with a display. Through the use of the NFC chip 170, an example meter 100 can utilize an external device such as a smartphone in place of a conventional display. Further examples of the usefulness of a display-less meter are described in more detail below.

Each peripheral device 145 may expand capabilities of the meter 100. For example, and not by way of limitation, a servicing tool is attachable by way of an auxiliary slot, thereby becoming a peripheral device 145. For another example, if hardware (e.g., the RF radio 160) malfunctions, an additional or updated version of that hardware may be connected via an auxiliary slot to become a peripheral device 145. It will be understood that various possible uses of peripheral devices 145 are supported according to implementations of the invention.

In some implementations, the metrology engine 105 performs time-critical functions of the meter 100, such as consumption accumulation and calculations. For instance, the metrology engine 105 continuously measures samples of consumption and calculates accumulated consumption over established time periods. For example, in the case of an electric meter, the metrology engine 105 calculates accumulated consumption in kilowatt-hours (kWh). As described in more detail below, the metrology engine 105 may include a processing unit, such as an MCU, utilizing an RTOS. Use of the RTOS guarantees certain response times in the hardware and thus ensures that resulting consumption data is calculated accurately. Additional details of the metrology engine 105 are described in more detail below.

In some implementations, with the MCU handling real-time tasks and allowing the MPU 110 to handle higher-level applications (i.e., non-time-critical applications), the MPU 110 is able to effectively support a wide range of applications. Software applications installed on the meter 100 and run by the MPU 110 can be modular and decoupled from the underlying firmware. As a result, the meter 100 can be a system with various nonconventional features implemented as applications that run over the MPU without interfering with time-critical tasks being performed by the MCU.

Figure 2:
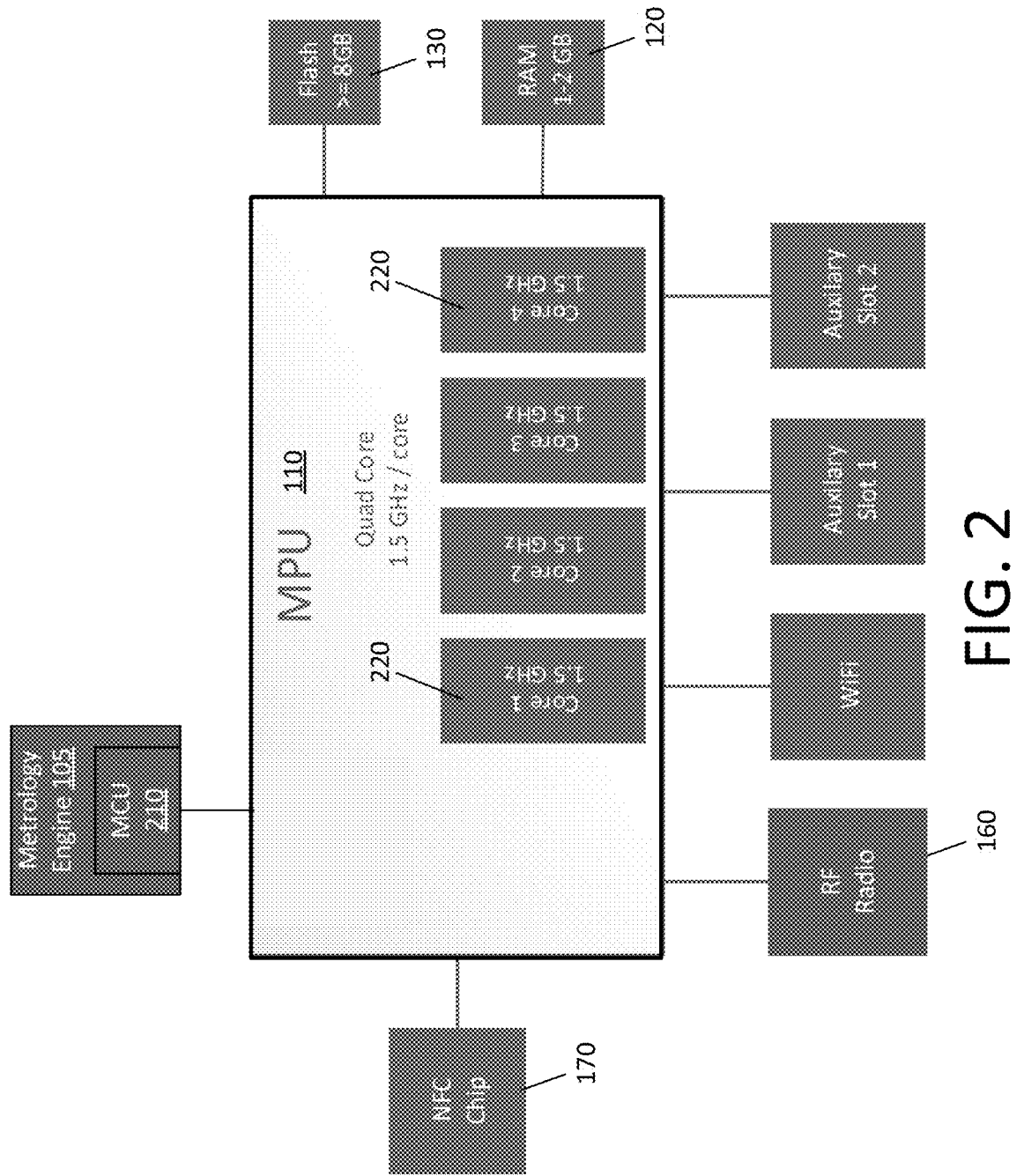
FIG. 2 is another diagram of an example hardware architecture of the utility meter, according to some implementations described herein.

FIG. 2 is another diagram of an example hardware architecture of the utility meter 100, according to some implementations of the invention. As described above the metrology engine 105 performs core metrology functions of the meter 100. As shown in FIG. 2, in some implementations, the metrology engine 105 includes a metrology processor, specifically an MCU 210 running an RTOS in some implementations. The metrology engine 105 may be embedded in the meter 100 and in communication with the MPU 110. However, the metrology engine 105 may include a distinct processor and distinct memory, such that the processor and the memory of the metrology engine 105 have distinct hardware from, respectively, the MPU 210 and the memory 120 associated with the MPU 210. For instance, the MCU 210 of the metrology engine 105 may include an integrated memory that is dedicated to the metrology engine 105. In one example, the MCU 210 of the metrology engine 105 is a Cortex-M7 600 MHz with an RTOS, such as Real-Time Linux. For further example, the MPU 110 may be quad-core and capable of running at 1.5 GHz per core, as in example MPU 110 shown in FIG. 5. It will be understood, however, that other types of processing units are useable in place of the MCU 210 or in place of the MPU 110 shown in FIG. 2.

In some implementations, the metrology engine 105 runs over the MPU 110 rather than utilizing a separate processor. For example, and not by way of limitation, a separate logical partition may be implemented in the memory 120 and storage 130, and an RTOS or other mechanism for enforcing real-time functionality may be installed over this logical partition to implement the metrology engine 105.

In some jurisdictions, certain aspects of metrology processing are required by law to meet certain security and data protection requirements, which may require separately partitioned memory and separate processing, and implementations of the invention comply with such requirements through the use of separately partitioned memory and a separate processor or processing core. Due to such requirements, special procedures must be used for firmware upgrades, security, and validation, and such procedures may be enforced on the metrology engine 105 without having to be enforced for applications running over the MPU 110.

In some implementations, as shown in FIG. 2, the RF radio 160 also incorporates an RTOS. Like the metrology engine 105, the RF radio 160 may include its own processor, such as an MCU, on which the respective RTOS runs. Either or both of the metrology engine 105 and the RF radio 160 may be integrated with the MPU 110 as a single chip, or each of the metrology engine 105 and the RF radio may incorporate a distinct MCU 210 that communicates with the MPU 110 via a driver.

Functions other than those that require the RTOS may run on the MPU 110. In some implementations, only functions that are time-critical run over the RTOS, while other functionality is implemented over the MPU 110. More specifically, this other functionality may be implemented as one or more applications running over the MPU 110 by way of an operating system, such as Linux, that need not be an RTOS. Such other applications may be updateable remotely, such as over the air by way of a communication device 150.

Figure 3:
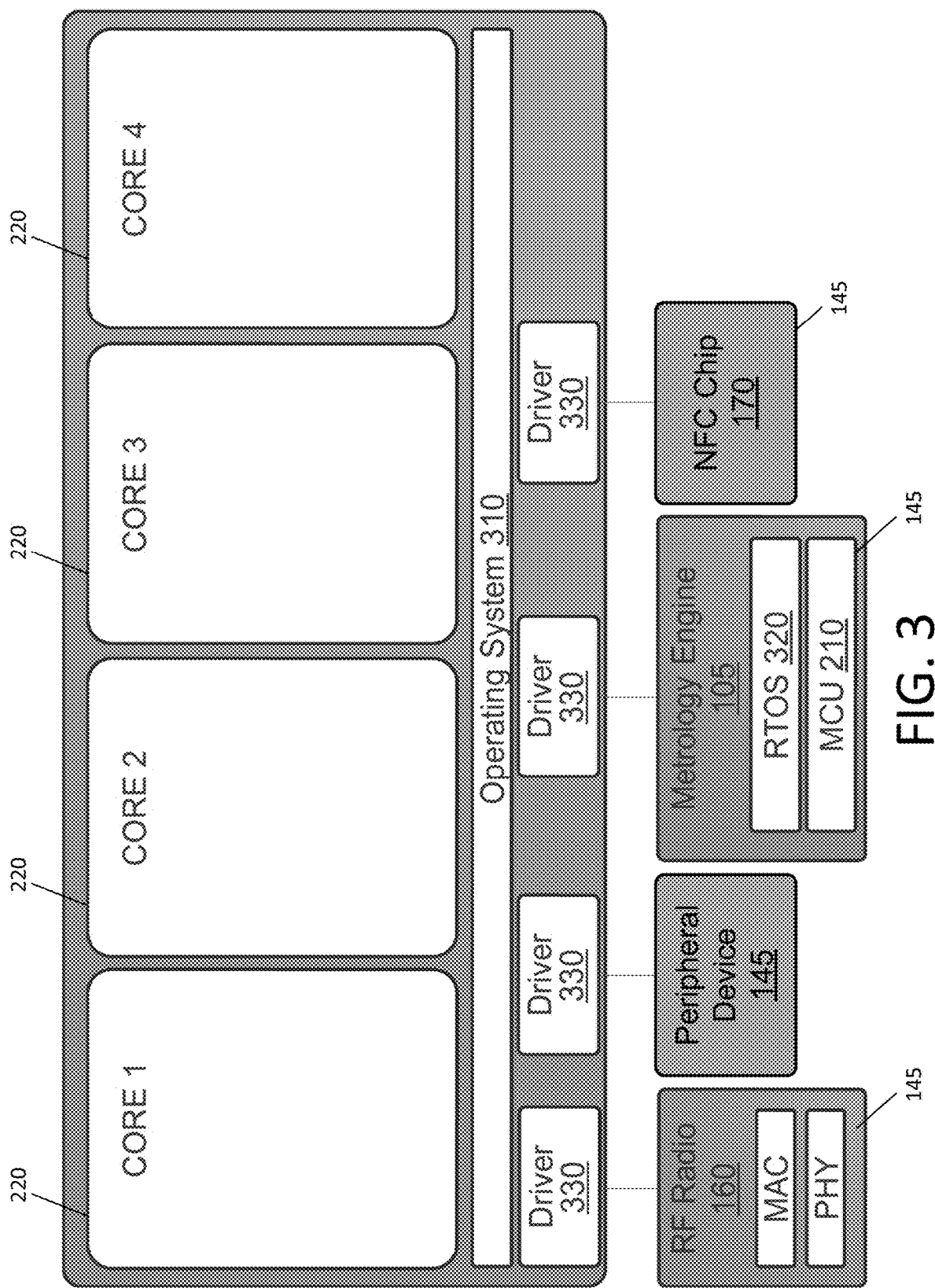
FIG. 3 is a diagram of an example hardware and software architecture of the meter, according to some implementations described herein.

FIG. 3 is a diagram of an example hardware and software architecture of the meter 100, according to some implementations of the invention. As shown in FIG. 3, in some implementations, an operating system (OS) 310 runs on the MPU 110 and may support multithreading or multiprocessing, while an RTOS 320 runs on the MCU 210 or other processor of the metrology engine 105. As described above, the RTOS 320 enables that metrology engine 105 to perform time-critical operations. The OS 310 and the RTOS 320 may be distinct, in that, for example, the RTOS is a different operating system than the OS 310 of the MPU 210 or the RTOS is a different installation of the same operating system. In the case that the OS 310 and RTOS 320 are different installations of the same operating system, then both the OS 310 and the RTOS 320 may be real-time operating systems. In certain implementations, however, Linux is the OS 310 of the MPU 110 while Real-Time Linux is the RTOS 320 of the metrology engine 105. It will be understood, however, that various operating systems are useable for each of the processors, and that the OS 310 of the MPU 110 can, but need not be, an RTOS 320 as well.

In some implementations, the meter 100 includes a set of software interfaces (i.e., application programming interfaces) defined for interactions between time-critical operations running on the RTOS 320 and non-time-critical operations running outside the RTOS 320. In one example, the meter 100 implements a first application programming interface (API) defined for sending data from the meter 100 to other devices and may implement a second API for receiving data at the meter 100 from other devices. To transmit data from an application run by the MPU 110, or from some other non-time-critical component, the OS 310 may call a function in the first API to transmit that data to a headend system, to another meter, or elsewhere. In some implementations, the RTOS 320 receives the function call and schedules the operation to send the data over the RF radio 160 during the next available time slot. When that next available time slot arrives, an implementation of the RTOS 320 ensures that the data indicated in the function call is sent on an appropriate channel as indicated by an established channel-hopping policy that defines which channel to use at each time slot. If the data does not fit into a single time slot, the RTOS 320 may divide the data to send at various time slots and potentially across various channels as needed.

Additionally or alternatively, the OS 310 utilizes an API to control a maximum transmit power level or an API to indicate an average signal strength for the RF radio 160. The RF radio 160 may collect various summary statistics, such as the number of bit errors during transmissions and receipts, the number of dropped packets, or other statistics, and the OS 310 may use one or more APIs to request this data or other data from the RF radio 160. Additionally or alternatively, in some implementations, the meter 100 may implement one or more APIs for communication between the OS 310 and the metrology engine 105. The RTOS 320 of the metrology engine 105 may handle time-critical generation of metrology data (e.g., consumption data or other data generated by or collected by the metrology engine 105) and associated high-speed processing of that metrology data, and the RTOS 320 uses one or more APIs to deliver indications of such metrology data (e.g., measurements in kilowatt-hours, power factor, peach voltage, or current) to the OS 310.

As shown in FIG. 3, in some implementations, each core 220 of the MPU 110 is responsible for certain functionality of the meter such that, for instance, a core 220 runs the threads of applications implementing that functionality. In this example, the MPU 110 has four cores 220, also referred to as processor cores, but it will be understood that the number of cores 220 of the MPU 110 may vary. In this example, a first core 220 is responsible for running the OS 310 as well as running legacy code (e.g., applications traditionally built into firmware of a meter); a second core 220 is responsible for running Java applications or other types of applications; a third core 220 is responsible for running metrology applications, such as non-time-critical metrology applications; and a fourth core 220 is responsible for all other operations of the meter 100.

Additionally, as shown, one or more drivers 330 may be installed over the operating system 310 to enable expansion and, more specifically, to provide support for peripheral devices 145. In this example, the peripheral devices 145 include the NFC chip 170, the RF radio 160, the metrology engine 105, and an additional peripheral device 145. Generally, the NFC chip 170 may communicate with a proximate external device as needed by the meter 100. For instance, as will be described in more detail below, the NFC chip 170 may communicate with a smartphone used in lieu of a display, such that the meter 100 itself need not incorporate a display.

It will be understood that FIG. 3 depicts an illustrative example and does not limit the scope of various implementations of the invention. For instance, alternatively, the cores 220 need not be assigned specific responsibilities but may instead share the load of the various functionalities of the meter 100. For another example, responsibilities may be allocated differently than shown and described herein.

Figure 4:
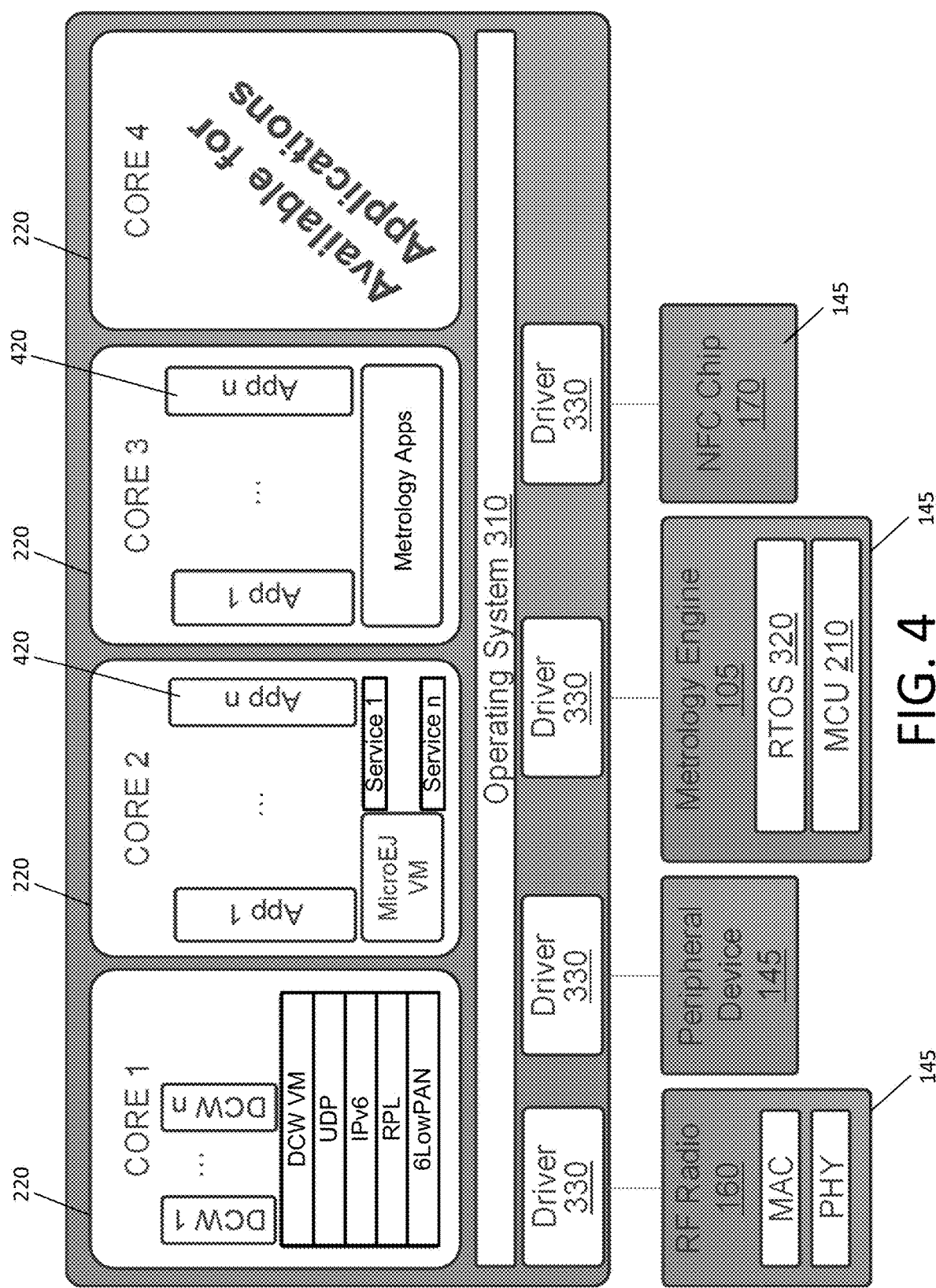
FIG. 4 is a diagram of another example hardware and software architecture of the meter, according to some implementations described herein.

FIG. 4 illustrates another example hardware and software architecture of the meter 100, according to some implementations of the invention. In this example, the first core 220 implements a Device Control Word (DCW) virtual machine (VM) utilizing Internet Protocol Version 6 (IPv6) over Low-Power Wireless Personal Area Networks (6LowPan).

More specifically, as shown in FIG. 4, the DCW VM may utilize User Datagram Protocol (UDP) over IPv6 with the Routing Protocol for Low-Power or Lossy Networks (RPL). The DCW VM provides an environment for running coded legacy operations, specifically, legacy DCWs. Thus, some implementations of the meter 100 enable the use of new, complex applications that take advantage of multithreading, while also providing backward compatibility with functionality incorporated into legacy firmware. In this example, the second core 220 is responsible for providing one or more services and a MicroEJ® VM for software utilizing the MicroEJ platform, as well as one or more applications running over the MicroEJ VM or the one or more services. A third core 220 of the MPU 110 is dedicated to metrology applications 420, which utilize consumption data determined by the metrology engine 105. A fourth core 220 is available for other applications 420 that may or may not utilize consumption data. Further, in this example, the OS running on the MPU 110 is Linux while the RTOS 320 running on the MCU 210 (i.e., in the metrology engine 105) is Real-Time Linux. It will be understood, however, that this example is for illustrative purposes only.

Figure 5:
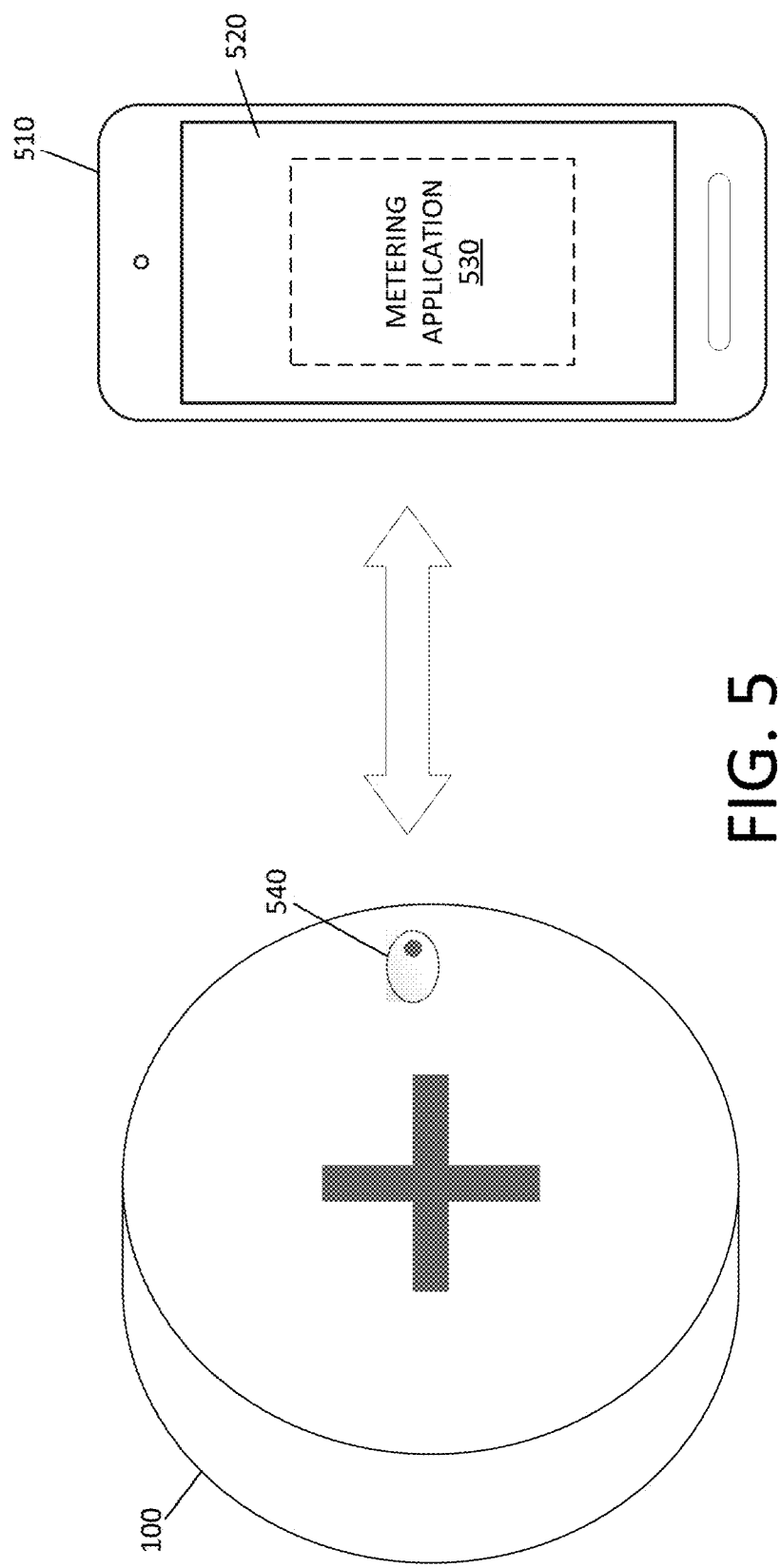
FIG. 5 illustrates an example of the meter wirelessly connected to an external device, according to some implementations described herein.

In some implementations, the meter 100 is configured to directly connect to an external device, such as a smartphone or other device. FIG. 5 illustrates an example of the meter 100 wirelessly connected to an external device 510, according to some implementations of the invention. More specifically, the example of FIG. 5 illustrates that the external device 510 is a smartphone, but it will be understood that the external device 510 may alternatively be a tablet, notebook computer, or other external device 510 capable of being utilized as described herein.

As mentioned above, the meter 100 need not incorporate a display. More specifically, according to some implementations, an example meter 100 lacks a screen, such as an LCD screen, to display textual or other information. Further, in some implementations, the meter 100 lacks a button or an optical port. Conventionally, one or more buttons are included on a meter to initiate test mode, to initiate reset, to toggle what is shown on the display, or to perform other functions, and an optical port is used to enable a local connection for receiving a firmware upgrade or configuration parameters. The exclusion of such components can reduce the cost of manufacturing the meter 100 while these functionalities can be retained through the use of one or more communication devices 150 as described herein.

In some implementations, among the one or more communication devices 150 incorporated into the meter 100 is an NFC chip 170. The NFC chip 170 of the meter 100 may connect the meter 100 to the external device 510 via NFC. For example, and not by way of limitation, the range of the NFC chip 170 may be approximately 0-4 inches, such that the external device 510 is within 4 inches of the meter 100 during the connection. This short range may be useful to reduce the capability of remote devices connecting to the meter 100 for malicious purposes. Further, in some implementations, the meter 100 verifies authorization of the external device 510, such as by confirming a signature or certificate of the external device 510, to ensure that the external device 510 is authorized to access the meter 100.

It will be understood that an alternative communication device 150 may be used in lieu of the NFC chip 170 to provide communications with the external device 510. For instance, a radio-frequency identification (RFID) device, Bluetooth, or WiFi may be used to connect the meter 100 to a smartphone or other external device 510 to be utilized as a display, or the meter 100 may include a port (e.g., optical or universal serial bus (USB)) enabling a wired connection to the external device 510 for communications.

In some implementations, the external device 510 has an integrated or attached display 520, which is utilized in place of a display on the meter 100 itself. Instead of rendering information to an integrated display of the meter 100, as is done conventionally, information to be rendered is transmitted by the meter 100 to the external device 510, which displays such information. In other words, the external device 510 provides a user interface to the meter 100. Through that user interface, a user can manually provide instructions to the meter 100 or receive data from the meter 100. For example, and not by way of limitation, the meter 100 may transmit to the external device 510 one or more of the following types of information for display: consumption data (e.g., in kilowatt-hours) describing an amount of a resource consumed, real-time or historical demand (e.g., in kilowatts) of the resource, log files, internal time, time in service, information about load disaggregation, power factor, and bill estimation.

Conventionally, the meter 100 participates in a mesh network and thereby transmits consumption data to a headend system, typically indirectly by way of one or more intermediate nodes. The headend system may then make the consumption data accessible through a cloud only after the consumption data has been stored in a centralized location. In some implementations, however, an external device 510 receives consumption data directly from the meter 100 without having to wait for the consumption data to be received at the headend system or stored in the cloud. The meter 100 is configured to transmit, directly to the external device 510, real-time or near-real-time consumption data describing consumption measured by or otherwise collected by the meter 100. In some implementations, the transmission of real-time or near-real-time consumption data occurs before this consumption data is available to the headend system or in the cloud. In some implementations, additionally or alternatively to sending consumption data to the external device 510, the meter 100 may to send other data to the meter 100. For instance, the meter 100 may enforce a policy as to what data is accessible by the external device 510, where that policy is established by a service provider or some other entity associated with the meter. The policy may dictate which data the meter 100 is allowed to transmit to the external device 510; that data may or may not differ from the data transmitted from the meter 100 to the headend system and may be more or less restricted than data transmitted from the meter 100 to the headend system.

In some implementations, the external device 510 performs analytics or other data processing based on information received from the meter 100. Because an external device 510 likely has a higher-quality display 520 than does a conventional meter, the external device 510 can render consumption data or other information in a user-intuitive visualization, such as graphically in the form of tables or graphs, or the external device 510 can recognize patterns in the consumption data or perform other complex processing.

To this end, in some implementations, a metering application 530 is executable by the external device 510, where the metering application 530 provides a graphical user interface to the meter 100 and may be configured to perform other tasks associated with consumption data. In some implementations, access to the meter 100 by way of the metering application 530 is limited to authorized users and, further, the type of allowed access may vary across users.

For instance, a customer can connect an external device 510 to the meter 100, and during that connection, the meter 100 may allow read-only access to the external device 510. In some implementations, before read-only access is allowed, the external device 510 may be required to authenticate itself to the meter 100, which may require that the customer provide authentication information (e.g., a username and password, biometric data) to the external device 510. To authenticate itself, the external device 510 may transmit this authentication information provided by the customer to the meter 100 by verifying the authentication information; additionally or alternatively, after the external device 510 authenticates the user, the external device 510 may provide other appropriate authentication data (e.g., a signature or an authorized certificate) to the meter 100 to authenticate the external device 510 responsive to having authenticated the user.

Upon giving access to the external device 510, the meter 100 may receive instructions manually entered by a user of the external device 510. Further, the meter 100 may transmit data to the external device (e.g., via NFC), where that data may include, for example, an indication of consumption data over a predetermined period. In some implementations, the utility meter 100 transmits such data to the external device responsive to an instruction entered by a user at the external device 510, where such instruction is a request for the consumption data. The external device 510 may be configured to provide further details, to analyze consumption data provided by the meter 100, or to render a visualization (e.g., a graph, table, or chart). The external device 510 may perform one or more of such tasks responsive to a user request received at an interface of the external device 510. For instance, upon receiving a request for a specific form of visualization of the consumption data, the external device 510 may analyze the consumption data as needed and may display the resulting visualization via the display 520 of the external device 510.

In some implementations, the external device 510 is able to perform analyses and render advanced graphics based on consumption data received directly from the meter 100. For example, and not by way of limitation, the external device 510 analyzes the consumption data to determine consumption trends over a predetermined or selected period and, thereby, make predictions about future usage. In some implementations, the external device 510 performs disaggregation to identify which appliances are in use on the premises. In some implementations, such analyses requires the use of artificial intelligence implemented on the external device 510 through the metering application 530.

In some implementations, the external device 510 is configured to calculate a bill amount that will be due to be paid by the user based on the consumption data, which represents a utility consumed by the customer. The calculated amount may be applicable to a pre-pay meter, in which case the amount may be a suggestion based on past consumption, or to a post-pay meter, in which case the amount may be a prediction of an upcoming bill based on actual consumption that has occurred. Further, the external device 510 may determine a consumption trend, such as through artificial intelligence, to calculate an estimated bill amount based on expected future consumption. The external device 510 may initiate a payment, in a calculated amount or in another amount selected by the user, to an account associated with the customer's utility consumption. In some implementations, payments received are processed at the meter 100 at the request of the external device 510, and confirmation is transmitted to a centralized location (e.g., to the headend system or to a cloud) via the RF radio 160 or via another communication device 150. Additionally or alternatively, the meter 100 or the external device 510 may transmit payment information to a centralized payment-processing source (e.g., a payment server) for processing, and some implementations, the headend system may act as that payment-processing source. In that case, the payment-processing source, such as the headend system, processes the payment and sends acknowledgment back to the meter 100 or the external device 510. The external device 510 can display an indication of the acknowledgment to the customer as a confirmation that the payment was made. Thus, the customer may be enabled to view consumption data and to pay prior to receiving a bill, where that payment may be based on an estimation according to a consumption trend. In other words, the customer may be enabled to make a pre-payment initiated by the external device 510, based on consumption data directly transmitted from the meter 100 to the external device 510.

In some implementations, the metering application 530 connects to other applications on the external device 510, which may enable such other applications to utilize the consumption data. For example, and not by way of limitation, a connected application (e.g., an application to which the metering application 530 is connected) may generate a PDF or may initiate a print job rendering consumption data or other information received from the meter 100. For another example, the metering application 530 may connect to a calendar or task manager of the external device 510 to set a reminder to pay the bill or to perform some other metering-related task. It will be understood that the metering application 530 may connect to various other applications to provide additional or alternative services based on information received from the meter 100.

In some implementations, there exists a hierarchy of access, and an external device 510 of an authorized technician has additional or alternative access to information on the meter 100. For instance, after the metering application 530 has authenticated a technician, or after the meter 100 itself has authenticated the external device 510 as being in use by a technician, the metering application 530 may provide to the external device 510 both read and write access to the meter 100, where the write access may or may not be limited in some respect. For example, and not by way of limitation, the technician is enabled to initiate a test mode, program, or reset the meter 100 by way of instructions or other data entered into the external device 510. Such instructions or other data may be transmitted from the external device 510 to the meter 100. For instance, the external device 510 may push an on-site firmware or software update to the meter 100 over the air, without the use of a physical adapter.

Despite lacking a display, an example meter 100 includes one or more lights that can be used during calibration or for other purposes. For example, and not by way of limitation, the meter 100 includes a light-emitting diode (LED) device 540 that is configured to blink, or pulse, during a process of calibrating the meter or performing other tasks. In some implementations, the timing or pattern of the pulses follows an established pattern, such that a technician is enabled to calibrate the meter or perform some other task based on information conveyed by the pulsing. In that case, various states of the light, where a state is a combination of a color and a pattern in which that color is presented (e.g., solid or blinking at a certain frequency), are mapped to specific messages indicating information about the meter 100. Thus, given a state of the light, a technician can interpret that state as an indication that the meter 100 is providing the associated specific message and can behave accordingly. For example, and not by way of limitation, the LED device 540 blinks once when a predetermined amount of kilowatt-hours (e.g., one kilowatt hour) have been consumed, which provides a guideline during calibration. Additionally or alternatively, if the meter 100 includes an optical port, the LED device 540 may act as a transmitting LED for the optical port, which can also include a photodiode as a receiving transducer. Thus, the lack of an integrated display in the meter 100 need not reduce the capabilities of the meter 100 with respect to enabling calibration with traditional calibration equipment.

In addition to the above features, various benefits exist through the exclusion of a display on the meter 100 itself. For instance, the lack of a display may increase reliability of the meter 100 due to the elimination of faults related to a display. Long-term contrast and electrochemistry failures as well as other failures can result due to time, sunlight, heat, or humidity in a conventional meter display, and such failures can be eliminated by eliminating such a display from the meter 100. Further, the exclusion of a display may be a cost-effective choice, because the inclusion of an NFC chip 170 in place of a display is likely to cost less than the display would cost, because the mechanical design of the meter 100 can be simplified without the use of a display, and because the available printed circuit board (PCB) real estate is increased due to excluding a display.

In some implementations, due to exclusion of a display and an optical port in the meter 100, the remaining hardware described herein can be configured to fit onto a smaller PCB than is conventionally used, thereby significantly reducing cost and allowing additional space on the PCB for other features. More specifically, for instance, an implementation of the meter excludes the following: a display, which would likely require numerous traces; an optical port, along with a phototransistor and signal conditioning hardware; push buttons and corresponding reed switches, along with traces running to the buttons and signal conditioning hardware for the buttons. Typically, a display of a meter includes 36 traces running between the display and the processing unit, and these traces together require more than two square inches of PCB real estate. In some implementations, these traces are excluded from the meter 100 by excluding the display itself. An implementation of the meter 100 retains the following, which can likely fit on a smaller PCB than conventionally used: a power supply, memory 120, storage 130, the MPU 110, the metrology engine 105, and communication devices 150.

Numerous specific details are set forth herein to provide a thorough understanding of the claimed subject matter. However, those skilled in the art will understand that the claimed subject matter may be practiced without these specific details. The features discussed herein are not limited to any particular hardware architecture or configuration. A utility meter can include any suitable arrangement of components that behave as described herein. Any suitable programming, scripting, or other type of language or combinations of languages may be used to implement the teachings contained herein in software to be used in programming or configuring a utility meter or other device. Methods, apparatuses, or systems that would be known by one of ordinary skill have not been described in detail so as not to obscure claimed subject matter.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, or additions to the present subject matter as would be readily apparent to one of ordinary skill in the art.

What is claimed is:

1. A utility meter comprising:
   a metrology engine configured to measure consumption of a resource and to generate consumption data based on the consumption of the resource, the metrology engine comprising:
     a metrology processor;
     a dedicated memory; and
     a first operating system being a real-time operating system (RTOS) run on the utility meter by the metrology processor to enable the metrology engine to run time-critical metrology functions in real time;
   a microprocessing unit (MPU) coupled to the metrology processor, the MPU comprising one or more processor cores;
   a second operating system distinct from the first operating system and run on the utility meter by the MPU; and
   one or more metrology applications run by the MPU over the second operating system of the MPU, wherein the one or more metrology applications utilize the consumption data.

2. The utility meter of claim 1, wherein the MPU executes the one or more metrology applications through multithreading.

3. The utility meter of claim 1, wherein each processor core of the MPU is assigned to a respective subset of the functionalities of the utility meter, and wherein each processor core executes the respective subset of the functionalities on the utility meter.

4. The utility meter of claim 3, wherein a first processor core of the MPU is assigned to execute the second operating system, and wherein a second processor core of the MPU is assigned to execute the one or more metrology applications.

5. The utility meter of claim 1, further comprising a primary memory associated with the MPU, wherein the dedicated memory of the metrology engine comprises a logical partition of the primary memory.

6. The utility meter of claim 1, further comprising a primary memory associated with the MPU, wherein the dedicated memory of the metrology engine comprises distinct hardware from the primary memory.

7. The utility meter of claim 6, wherein the metrology processor is a microcontroller unit.

8. The utility meter of claim 1, further comprising:
   a radio configured to transmit the consumption data to a headend system;
   wherein a media access layer and a physical layer of the radio are executed by a second RTOS coupled to the MPU.

9. The utility meter of claim 1, wherein the MPU is configured to execute a virtual machine.

10. The utility meter of claim 1, wherein the MPU is configured to communicate with a cloud to run a cloud-based application.

11. The utility meter of claim 1, wherein the MPU is configured to collect additional consumption data from a peer meter.

12. The utility meter of claim 1, lacking an integrated display.

13. A utility meter comprising:
a metrology engine configured to measure consumption of a resource and to generate consumption data based on the consumption of the resource, the metrology engine comprising:
a microcontroller unit (MCU) comprising a metrology processor and a dedicated memory;
a first operating system being a real-time operating system (RTOS) run on the utility meter by the MCU to enable the metrology engine to run time-critical metrology functions in real time;
a microprocessing unit (MPU) coupled to the metrology processor, the MPU comprising one or more processor cores;
a primary memory associated with the MPU and distinct from the dedicated memory of the metrology engine;
a second operating system distinct from the first operating system and run on the utility meter by the MPU, wherein the second operating system is distinct from the RTOS of the metrology unit; and
one or more metrology applications run by the MPU over the second operating system of the MPU, wherein the one or more metrology applications utilize the consumption data generated by the metrology engine.

14. The utility meter of claim 13, wherein the second operating system supports multithreading, and wherein MPU executes the one or more metrology applications through multithreading.

15. The utility meter of claim 13, wherein:
each processor core of the MPU is assigned to a respective subset of the functionalities of the utility meter, and each processor core executes the respective subset of the functionalities on the utility meter;
a first processor core of the MPU is assigned to execute the second operating system on the utility meter; and
a second processor core of the MPU is assigned to execute the one or more metrology applications on the utility meter.

16. The utility meter of claim 13, lacking an integrated display.

17. A method comprising:
installing into a utility meter a microprocessing unit (MPU) comprising one or more processor cores;
installing into the utility meter a metrology engine coupled to the MPU and configured to measure consumption of a resource and to generate consumption data based on the consumption of the resource, the metrology engine comprising:
a metrology processor; and
a dedicated memory;
installing on the utility meter a first operating system, being a real-time operating system, configured for running by the metrology processor to enable the metrology engine to run time-critical metrology functions in real time;
installing on the utility meter a second operating system distinct from the first operating system, wherein the MPU is configured to run the second operating system; and
installing one or more metrology applications over the second operating system of the MPU, wherein the one or more metrology applications utilize the consumption data.

18. The method of claim 17, further comprising associating a primary memory with the MPU, wherein the dedicated memory of the metrology engine comprises a logical partition of the primary memory.

19. The method of claim 17, further comprising associating a primary memory with the MPU, wherein the dedicated memory of the metrology engine comprises distinct hardware from the primary memory.

20. The method of claim 17, wherein the second operating system supports multithreading.

* * * * *